United States Patent
Zwicker

(10) Patent No.: US 6,771,059 B1
(45) Date of Patent: Aug. 3, 2004

(54) SYNCHRONOUS RECTIFIER CONTROLLER FOR POWER SUPPLY SYSTEMS WITH HIGH POWER SWITCH AND HIGH EFFICIENCY

(75) Inventor: Robert M. Zwicker, Olympia, WA (US)

(73) Assignee: Delta Electronics,, Inc., Taipei (TW)

( * ) Notice: Subject to any disclaimer, the term of this patent is extended or adjusted under 35 U.S.C. 154(b) by 363 days.

(21) Appl. No.: 09/727,713

(22) Filed: Nov. 28, 2000

(51) Int. Cl.[7] .................. G01R 19/22; G01R 31/36; H02M 3/335
(52) U.S. Cl. .................. 324/119; 324/771; 363/21.06
(58) Field of Search .................. 324/771, 119, 324/120, 76.11, 607, 649; 363/5, 35, 127, 89, 21.01, 21.06; 323/304

(56) References Cited

U.S. PATENT DOCUMENTS

| | | | | |
|---|---|---|---|---|
| 5,303,138 A | * | 4/1994 | Rozman | 363/21 |
| 5,625,548 A | * | 4/1997 | Gold et al. | 363/98 |
| 5,631,810 A | * | 5/1997 | Takano | 363/21.05 |
| 5,786,687 A | * | 7/1998 | Faulk | 323/289 |
| RE36,098 E | * | 2/1999 | Vinciarelli | 363/20 |
| 5,920,475 A | * | 7/1999 | Boylan et al. | 363/127 |
| 6,288,919 B1 | * | 9/2001 | Jain | 363/89 |
| 6,292,380 B2 | * | 9/2001 | Diallo et al. | 363/89 |
| 6,307,757 B1 | * | 10/2001 | Porter et al. | 363/21.01 |

* cited by examiner

*Primary Examiner*—Anjan K. Deb
(74) *Attorney, Agent, or Firm*—Bo-In Lin

(57) ABSTRACT

The present invention discloses an AC-to-DC converter that includes a transformer having a primary side for inputting an input signal and a secondary side for outputting an output signal. The AC-to-DC converter further includes a synchronous rectifier controller connected to the secondary side for controlling a synchronous rectifier (SR) switch on the secondary side for generating the output signal. The SR switch is implemented as a MOSFET transistor with a gate connected to the synchronous rectifier controller. The synchronous rectifier controller further includes a plurality of circuit elements for turning off the SR switch before a main switch of the transformer is turned on. The synchronous rectifier controller further turns on the SR switch when the main switch of the transformer is turned off. The synchronous rectifier controller controls the SR switch and turns it off with a precisely controlled dead time before the main switch of the transformer is turned on.

12 Claims, 7 Drawing Sheets

US 6,771,059 B1

SYNCHRONOUS RECTIFIER CONTROLLER FOR POWER SUPPLY SYSTEMS WITH HIGH POWER SWITCH AND HIGH EFFICIENCY

BACKGROUND OF THE INVENTION

1. Field of the Invention

This invention relates generally to AC-to-DC converter systems. More particularly, this invention relates to an improved controller circuit design and configuration for use with synchronous rectification to achieve high power conversion efficiency.

2. Description of the Prior Art

Conventional art of design and manufacture of AC to DC converter systems is not able to satisfy the more advancing requirements now imposed by the high performance server technology. These requirements include smaller size, lower fan noise, high reliability, low cost and low power consumption. The power supply systems are now employed in the computer industries to convert various AC voltages ranging from one hundred to two hundred and forty volts to regulated DC voltages of 3.3, 5, 12 and −12 volts. Specifically, the difficulties arise from the facts that these requirements appear to constrain the designs of the power supply systems in opposite directions. On the one-hand the power supply is expected to produce more output power and be more reliable. On the other hand, the power supply is constrained by seemingly contradictory requirements that the system be made smaller, quieter, and cheaper. One of the best ways to satisfy these requirements is to increase the efficiency of the power supply system. This is because efficiency improvement would lead to reduction of heat generation thus allow for smaller size of a power supply to operate at a lower temperature that would increase the reliability and meanwhile require less noise generated by fans for heat-dissipation. Although, there may be a concern that a system designed for higher efficiency tends to be more complex, and this increases the production cost, such concerns are likely offset by the follow-on savings in heat dissipation, package, shipping, and cost reductions resulted from lower power consumption.

There are a number of ways to increase the efficiency of a power supply. A method is to reduce the losses in the output rectifier of a converter since these losses are relatively large compared to other losses. In a high frequency power converter as that shown in FIG. 1A, the standard devices for rectifying an output voltage of three to five volts are schottky diodes D1 and D2. FIG. 1A is a generic representation of a basic forward converter showing a conventional circuit configuration of forward switching converter for a power supply system operated with a pulse width modulator controlling a main switching transistor Q1 at the primary side. The Pulse Width Modulator is any one of many commercial integrated circuits, which can modulate a pulse width duty cycle based upon a feedback signal. Its output is an approximately 0 to 12V pulse waveform at a fixed frequency, e.g., a frequency of 100 KHz. This waveform drives the main switching transistor Q1. Transistor Q1 acts as a power switch under control of the Pulse Width Modulator output. With a rectified input voltage source 400 volts DC, the waveform appearing at the output (drain) of Q1 has a peak value of about 400 Volts or a peak-to-peak value of 800 Volts. The primary side is coupled to the secondary side with a transformer T1 with the secondary side provided with rectifying diodes D1 functioning as a forward output diode and D2 as a freewheel output diode. The output load is coupled in series with an output filter inductor and in parallel to an output filter capacitor. For a typical 5 Volt DC output, the transformer has a turns ratio defined by Np:Ns of about 15:1 where Np is the number of turns of the primary side and Ns is the number of turns of the secondary side. The peak voltage into the anode of D1 is around 25 Volts. When Q1 is on, D2 is reverse biased and D1 is forward biased (the anode is positive relative to the cathode). During this time, a positively sloped output current flows through D1 and L1 to the output load. L1 (output filter inductor) stores most of the transformer output energy pulse to produce a ramping current which is usually continuous. When Q1 is off, D1 is reverse biased and L1 maintains a negatively-ramping current by forward-biasing D2 as it discharges some of its stored energy. Except for resistive losses, the average voltage across C1 is identical to the average voltage across D2. C1 serves to filter the periodic and random perturbations from the DC output voltage so as to reduce them to acceptable levels.

As that shown in FIG. 1A, schottky diodes often cause a forward voltage drop of about 0.6 volts. Even if the power supply has no other losses, the voltage drops caused by the shottky diodes represent about ten to fifteen percent efficiency loss for a three to five volt output. In order to compensate for these losses, higher power is required prior to a rectification action taken by the schottky diodes. A higher power processed by prior stages of the power supply system tends to increase losses further during during these prior-stage-processing functions. As a result, the losses are compounded and the total efficiency losses are significantly increased. Conversely, the total power savings achieved by improving the output rectifier efficiency tend to have a reverse effect of compounding the improvement of the efficiency for the entire power supply system. There are methods to incrementally minimize the losses of the schottky diodes by optimizing the transformer and choosing the best schottky diodes. However, improvements of power losses achievable by using better schottky diodes are quite limited. Under the circumstances when a small performance improvement is required, better schottky diodes would generally be sufficient to satisfy the requirement. But when compared to another technique of applying a synchronous rectification, even the best schottky diodes would come short of matching the performance when synchronous rectification is employed for AC to DC conversion.

An effective method to increase the output rectifier efficiency is by implementing a controlled switch to achieve synchronous rectification. In the recent past, synchronous rectification was considered too exotic for commercial applications. The device most commonly used for the controlled switch is a MOSFET. Advancement in semiconductor technology has improved the cost/performance of the MOSFETs, and the power supply industry now begun to use synchronized rectification for performance improvement as the improvements achievable by the schottky are not sufficient to meet the demand of higher performance. The most commonly available switch is an n-channel MOSFET transistor that has an operation characteristic of providing a blocking voltage when the drain is positive relative to the source and the gate is at a zero or negative potential relative to the source. Due to an inherent drain-to body diode, there will be always a current even under a negative gate biased condition when the drain is negative relative to the source. This is normally considered as an undesirable feature for typical applications of the n-channel MOSFET. However, by providing a positive voltage to the gate, e.g., 10 volts relative to the source to turn on the n-channel MOSFET, the n-channel MOSFET will conduct a current with a very low voltage drop. This occurs regardless of the polarity of the voltage applied to the drain relative to the source. The MOSFET transistor thus provides an operation characteristic that is useful to function as a very efficient rectifier. Specifically, the rectifying function is achieved by adjusting the gate-source voltage to negative or zero to prevent a reverse current. And, conversely to generate a low voltage-drop conducting condition by adjusting the gate-source voltage to positive to provide a rectified current. The method is however depends on proper synchronization of the gate voltage to the variations of the relative source-drain potential. FIG. 1B shows a conventional synchronous rectified converter where the synchronization control signal is generated from the primary side. Specifically, a leading dead time (referring to FIG. 3 below) is generated from the control signals for Q1 and applied simultaneously to the synchronous rectifier switching transistor Q2 through a driver circuit. The pulse width modulation output is transmitted across the safety isolation barrier to driver circuit using a transformer or other device with a delay inserted between the PWM signal and main switch Q1 on the primary side. Such control scheme for achieving synchronous rectification has the disadvantages that it is necessary to provide an added signal path across the isolation barrier and usually that requires a bulky and expensive transformer. Also, the circuit of the primary circuit must be modified in order to accommodate this control scheme and that adds to the production cost of the power supply systems. Other than these considerations, the control method using synchronous rectification is employed in high efficiency non-isolated DC-DC converters commonly used to power the central processor unit (CPU) of a computer. However, due to above difficulties and considerations, and the facts that conventional power supply systems can usually tolerate lower efficiency, synchronous rectification is usually not employed in off-line power supply system for AC-DC conversions.

For the above reasons, a need still exists in the art of designing and manufacturing a power supply system with voltage rectifying converter to provide an improved apparatus and method to increase the efficiency of the rectifying operations. Specifically, an improved method to improve the synchronous rectification of a power supply system to achieve lower voltage drop with precise time control of gate voltage synchronization is required to overcome the difficulties and limitations faced by those of skill in the art of the power supply industry.

SUMMARY OF THE PRESENT INVENTION

It is therefore an object of the present invention to provide a novel and improved AC/DC converter to achieve a lower voltage drop for increasing the rectification efficiency with better cross regulation such that the more advanced requirements imposed on a power supply for high-performance servers can be satisfied.

Specifically, a synchronized rectification controller is employed to control a synchronized rectification (SR) switch implemented on the secondary side of the AC/DC converter. The SR switch is implemented as a MOSFET with synchronization rectifier controller control the sequence and timing of the gate voltage of the SR MOSFET in response to the switching on and off of the transformer and the voltage variations of the rectifier diodes used in the AC/DC converter. By precisely controlling the gate voltage of the SR MOSFET to assure an operation of synchronized rectification, higher conversion efficiency is achieved with lower voltage drops and power losses resulted from the AC/DC conversion process.

Another object of this invention is to provide improved synchronous rectification circuit configuration with new control circuit. The new control circuit allows the addition of synchronous rectification to the non-post regulated output of the power supply without any modifications to the transformer or the control of the primary side of the power supply and without any additional bridging to cross over the primary-secondary barrier.

Another object of this invention is to provide improved synchronous rectification circuit configuration with new control circuit to perform the necessary functions with inexpensive, commonly available parts as required circuit elements. The performance improvements are therefore achieved without unduly increasing the production cost of the power supply system.

Briefly, this invention discloses an AC-to-DC converter that includes a transformer having a primary side for inputting an input signal and a secondary side for outputting an output signal. The AC-to-DC converter further includes a synchronous rectifier controller connected to the secondary side for controlling a synchronous rectifier (SR) switch on the secondary side for generating the output signal. The SR switch is implemented as a MOSFET transistor with a gate connected to the synchronous rectifier controller. The synchronous rectifier controller further includes a plurality of circuit elements for turning off the SR switch before a main switch of the transformer is turned on. The synchronous rectifier controller further turns on the SR switch when the main switch of the transformer is turned off. The synchronous rectifier controller controls the SR switch and turns it off with a precisely controlled dead time before the main switch of the transformer is turned on.

These and other objects and advantages of the present invention will no doubt become obvious to those of ordinary skill in the art after having read the following detailed description of the preferred embodiment which is illustrated in the various drawing figures.

DETAILED DESCRIPTION OF THE INVENTION

Figure 2:
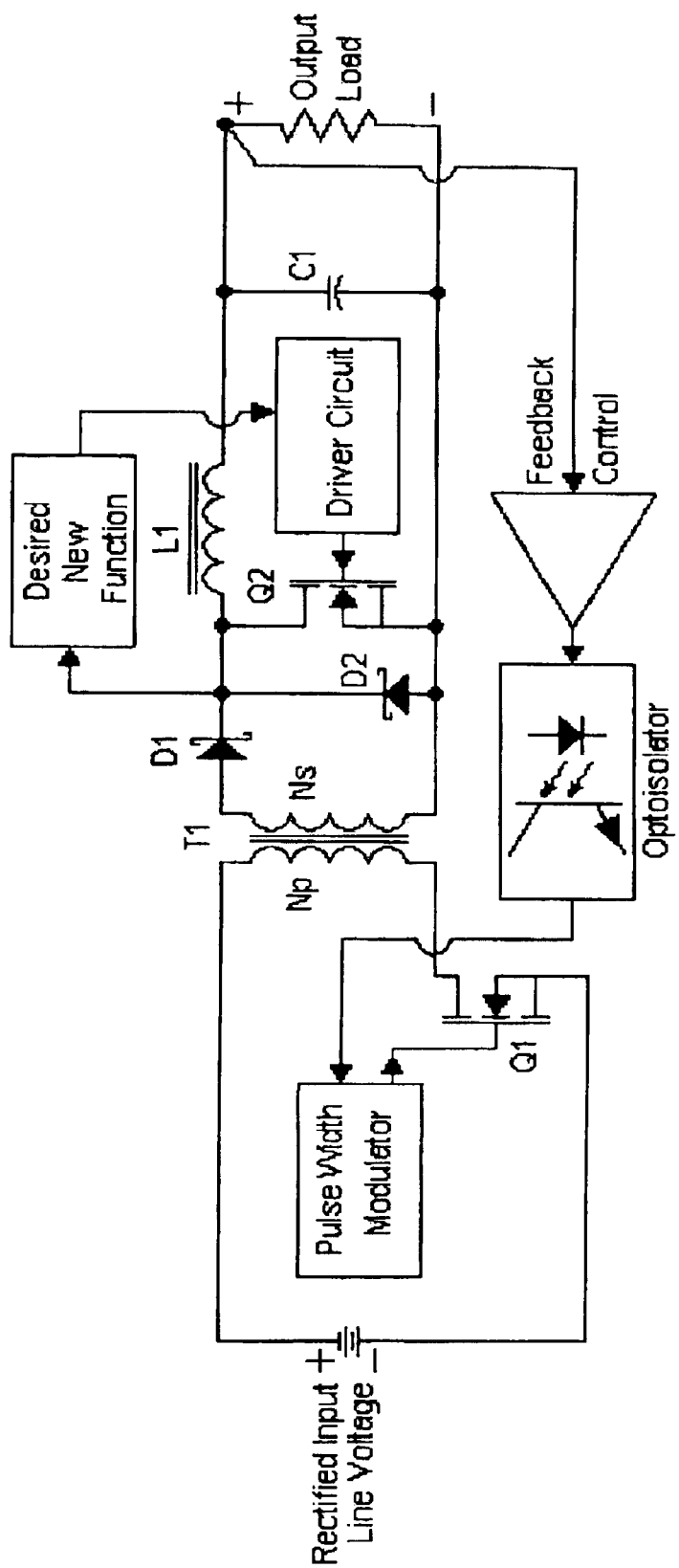
FIG. 2 shows the circuitry configuration of a forward AC/DC converter with synchronous rectifier controller of this invention with a synchronous switching control driver on the secondary side.
Figure 3:
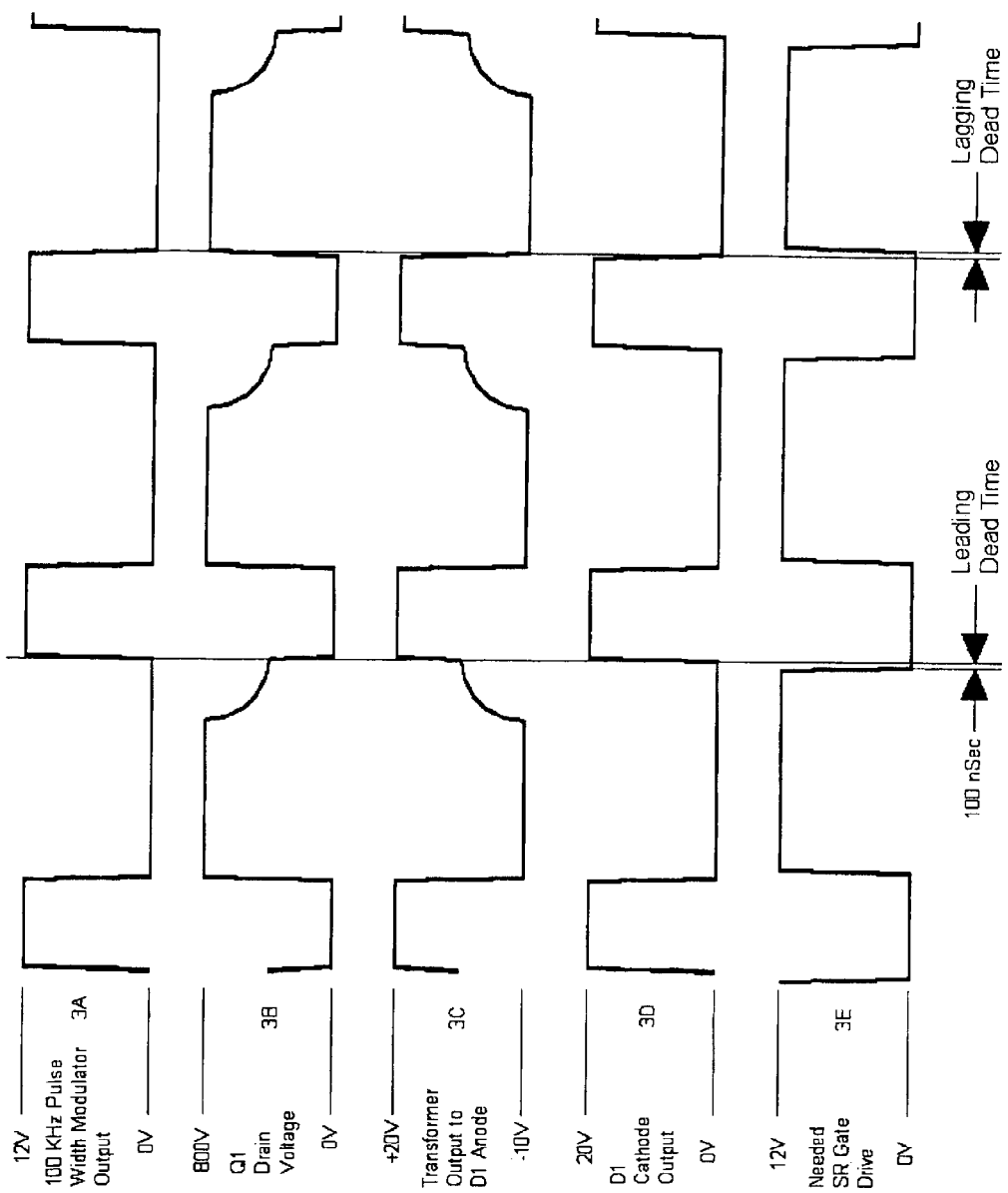
FIGS. 3A to 3E show the timing sequences of the operational characteristics of the converter according to a circuit configuration shown in FIG. 2.

Referring to FIG. 2 for a forward converter with synchronous rectifier controller of this invention for controlling a synchronous rectifier (SR) switch S1. The control circuit and the method to generate a leading dead time will be further discussed below. FIGS. 3A to 3E show the timing sequences of the operational characteristics of this converter according to a circuit configuration shown in FIG. 2 to achieve the synchronous rectification. The pulse width modulation as that shown in FIG. 2 is provided to generate a pulse width duty cycle of FIG. 3A based on a feedback signal. The output from the pulse width modulator is an approximate 0 to 12 volts pulse waveform at a fixed frequency, e.g., 100 KHz. The pulse width modulator controls a transistor Q1 that functions as a main switch on the primary side. When the output of the pulse width modulator is high, Q1 switches into an ON state with low resistance and forces one end of the transformer at the primary winding to a voltage near zero (FIG. 3B). With a voltage of 400 volts applied to the remote end of the transformer primary winding, the full 400V input is applied across the winding. When the output of the pulse width modulator is low, the transistor Q1 switches into an OFF state with a very high resistance to allow the transformer primary winding voltage to reset to a voltage near 800 volts. This voltage is normally controlled with a clamp circuit that is not discussed in this Application because it is not the main theme of this invention. After the transformer resets, the voltage across all windings drifts toward zero with a damped sinusoidal waveform and that is illustrated as the curved portion of the waveform of FIG. 3B. In response to the changes of the drain voltage of the transistor Q1, the voltage variations of the transformer output to D1 anode is shown in FIG. 3C and the D1 cathode output voltage is shown in FIG. 3D. FIG. 3E shows the voltage waveform applied to the synchronous switch SR gate. FIG. 3E shows the requirements of a leading dead time to turn off the S1 before the main switch Q1 on the primary side is turned on and a lagging dead time to turn on the S1 after Q1 is turned off.

Figure 4:
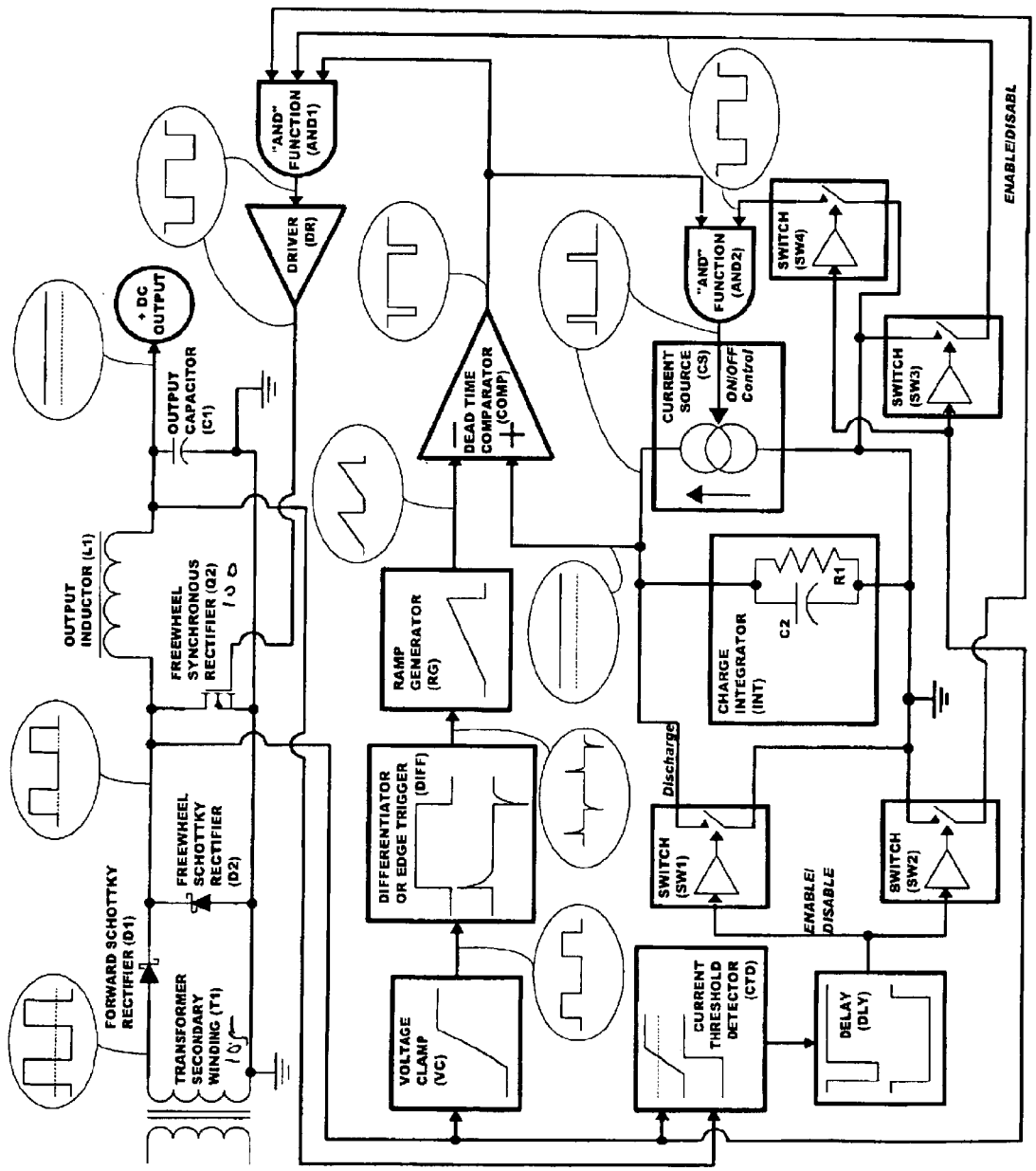
FIG. 4 is a block diagrams for illustrating different functional blocks necessary to carry out this invention.

Instead of applying a conventional method to generate the control signals for providing the leading and lagging dead time control from the primary side as discussed above for FIG. 1B, a novel circuit configuration is implemented as that shown in FIG. 4. A "desired new function" block is illustrated on the secondary side to generate the synchronous rectifying actions by controlling a driver circuit that drives a SR switching transistor Q2. The driver circuit employs the output on the secondary side from the transformer T1 and a diode D1 to control the gate of a MOSFET switching device implemented as synchronous rectifier switch Q2.

Figure 1A:
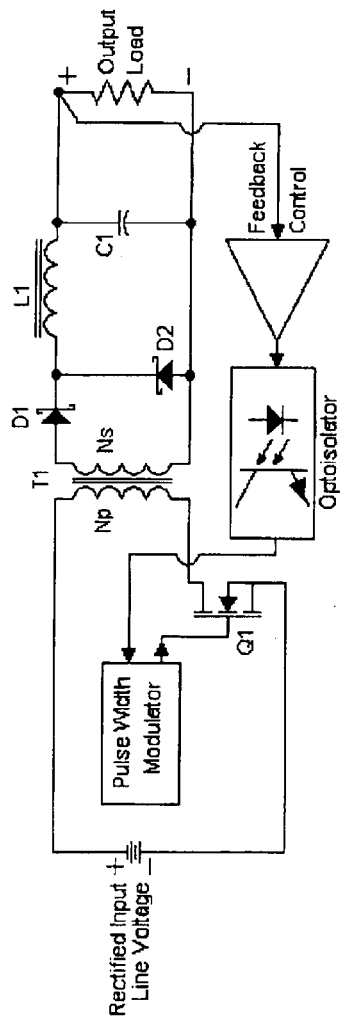
FIG. 1A shows the circuitry configuration of a conventional AC/DC converter implemented with basic forward switching topology.
Figure 1B:
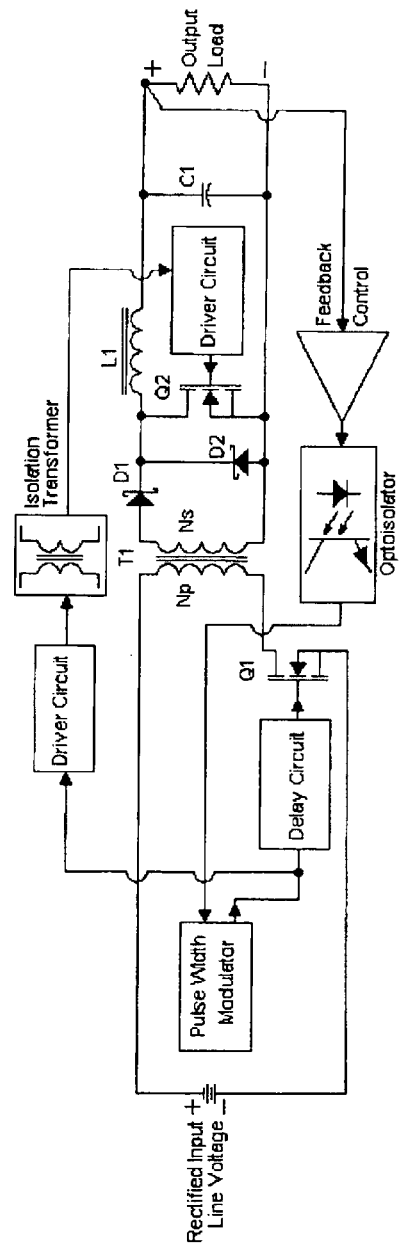
FIG. 1B shows a prior art synchronous-rectified AC/DC converter implemented with a primary side control.
Figure 5:
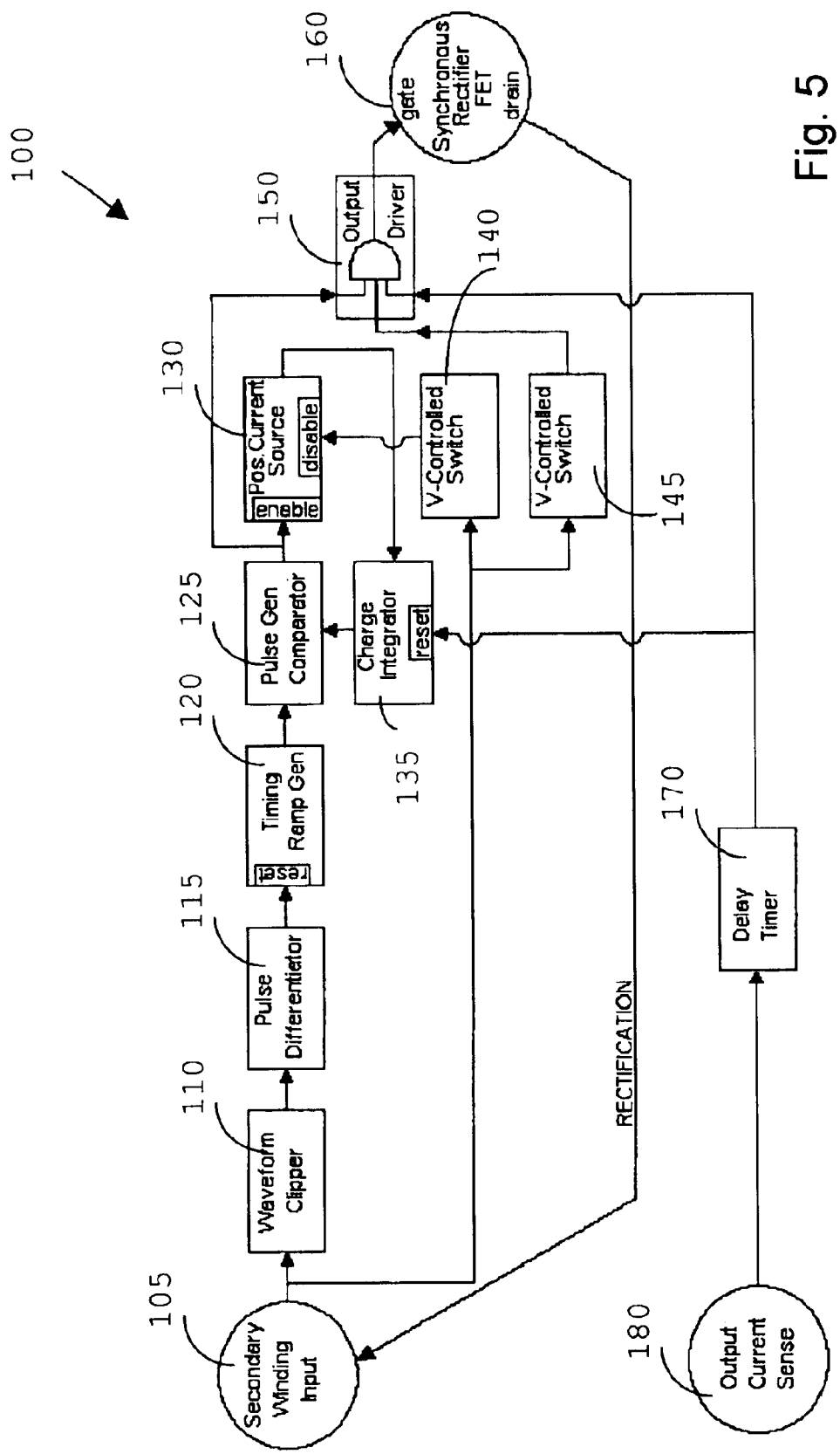
FIG. 5 is a specific circuit implementation of the block diagram shown in FIG. 4.
Figure 6:
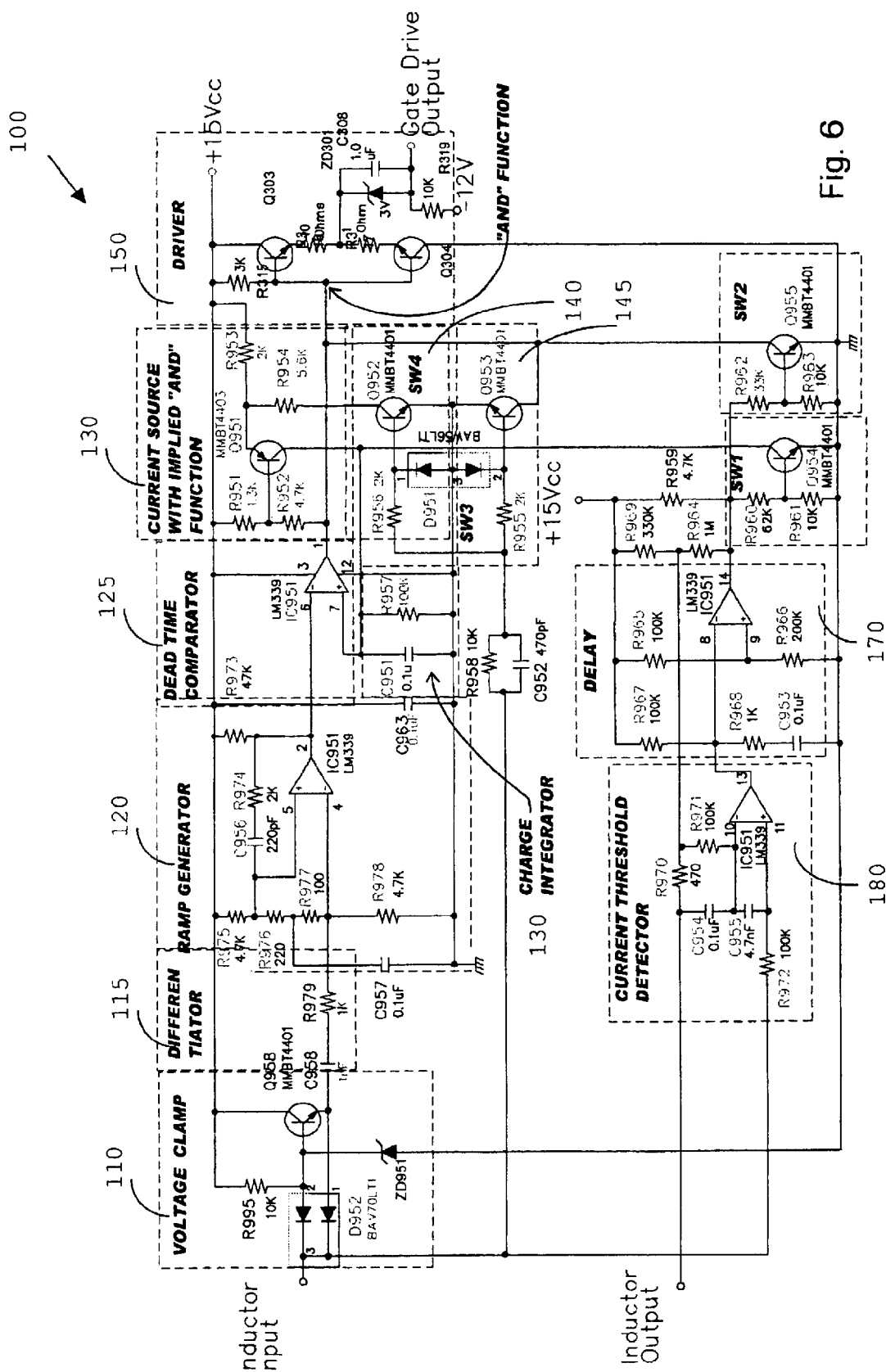
FIG. 6 shows the variations of voltages over time at different points of the synchronous rectifier controller relative to the transformer output.

Referring to FIG. 4 for a block diagram and FIGS. 5 and 6 for a specific circuit implementation of the block diagram shown in FIGS 1 and 4. FIG. 4 also shows the waveforms for the variations of voltage over time at different points of the circuit as processed by different functional blocks of FIG. 4 implemented according to FIGS. 5 and 6. The output from the secondary winding 105 is inputted to a synchronous rectifier controller 100 that includes a waveform clipper 110 implemented with diode D952, resistor 995 and transistor 958 and these circuit elements are employed to square up the input timing waveform from the +5 output rectifier. The waveform received from the secondary winding input 105 may have anomalies that can cause the dead time generator to malfunction. The waveform clipper 110 serves to minimize the anomalies such that the waveform is more closely approximated to a clean rectangular waveform. The signals processed by the waveform clipper 110 is transmitted to a pulse differentiator 115 implemented with C958 and R979 to produce a narrow pulse corresponding to the turn-on of the main switch transistor. The purpose of the differentiation is to provide immunity from the variable turn-off time of trailing edge-modulated main transformer waveform. A stable pulse is generated and used by a timing ramp generator 120 to synchronize and reset and re-trigger the timing ramp. The timing ramp generator 125 implemented with IC951:1, R973, R974, R975, R976, R977, R978, C95A, and C957 to produce a positive-sloped ramp that is reset and then re-initiated by the pulse from the differentiator 115. The timing ramp resets and restarts when the main switching transistor turns on. In a fixed frequency, trailing edge-modulated converter, the controller operates normally and the timing should not vary regardless of the variations of the input voltage or the output load. With each pulse from the differential 115 the ramp voltage is reset to the same low voltage and begins to ram p according to an R*C time constant of the resistor R973 and capacitor C956.

A pulse width generating comparator 125 compares the ramp voltage generated by the timing ramp generator 120 with the voltage of the charge integrator 135 implemented with a resistor R957 and capacitor C951. When the timing ramp voltage raises above the voltage on the charge integrator 135, the signal from the pulse width generating comparator 125 transmitted to the output driver is forced to a low voltage. And, the positive current source 130, implemented with transistor Q951, resistors R951, R952, and R53, is turned on. The positive current source 130 applies a fixed charge current to the charge integrator 135 whenever the output of the pulse width generating comparator 125 is low and the output of the transformer winding voltage dependent switch is high. In normal steady state operation, the voltage on the charge integrator 135 settles at an equilibrium voltage such that the current in the discharge resistor R957 equals to the average output of the positive current source that can be represented by a current set-point multiplied by the duty cycle. To achieve the purpose of synchronous rectification control, two transistors Q952 and Q953 are implemented as the transformer winding voltage dependent switches 140 and 145 respectively. The switch 140 implemented by the transist Q952 disables the current source 130 whenever the main switching transistor is turned on and the transformer output voltage is high. Meanwhile the second voltage controlled switch 145 implemented with transistor Q953 forces the signal to the output driver 150 low under the same condition, specifically when the main switching transistor is turned on and the transformer output voltage is high. The output driver 150 is connected to the gate of the synchronous rectifier FET 160 while the drain of the FET 160 is connected to the secondary winding input 105.

When the normal operation begins, the voltage on the charge integrator 135 is close to zero volts. The timing ramp voltage generator 120 has a voltage surpasses the voltage on the charge integrator 135 early in the operation cycle. A large dead-time signal is generated to quickly turn off the gate of the synchronous rectifier MOSFET 160 thus causes a long duration pulse of current from the positive current source 130 to raise the voltage on the charge integrator 135. The pulse is terminated when the transistor Q952 is turned on. With the increase in the voltage on the charge integrator 135, the dead time in the next cycle is shortened. This operational sequence continues as the voltage on the charge integrator 135 and the dead time settle exponentially to a stabilized equilibrium value. Adjusting the value of the positive current source 130 and the discharge resistor of the charge integrator 135 can program and tune the equilibrium value. With the circuit configuration shown in FIGS. 5 and 6, excess dead time is generate to provide safety margin during the startup period of the power system until the operation is stabilized.

Figure 7:
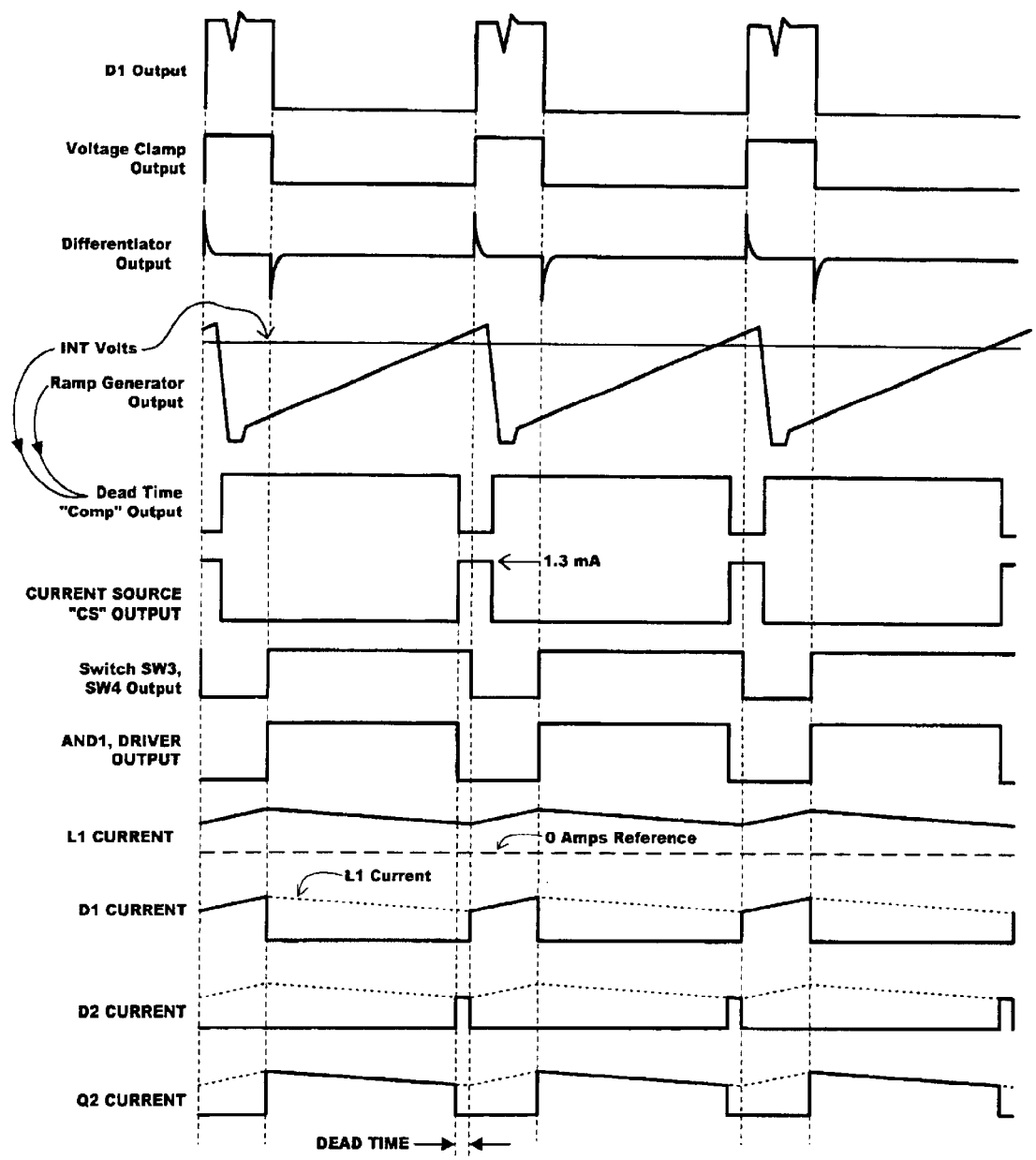
FIG. 7 shows an enabling and disabling timing diagram according to a circuit implemented as that shown in FIG. 5.

The synchronous rectifier controller includes an output current detector 180 to detect the output current. The synchronous rectifier (SR) switch must turn off when the inductor current approaches zero so that it does not conduct a reverse inductor current. This is achieved by disabling the SR MOSFET gate drive when DC output current is low. The sensing of output current with a current detector 180 is achieved by sensing the DC voltage drop across the output inductor. The terminal labeled inductor input in FIG. 6 has a pulse waveform and the output is a DC current. Ideally the inductor would integrate the waveform to produce a filtered DC output. However, the copper wire in the inductor has some DC resistance and the resistance when multiplied by the DC current produces a DC voltage drop. The terminal labeled with inductor output is connected to other end of the inductor. The potential difference between these two points is a large AC pulse waveform, typically more than 10 volts, and a small average DC voltage, typically less than 0.1 volts. For the function described above, the output current detection is not required to be highly accurate and the inductor-induced DC voltage is sufficiently accurate when proper filtering is applied and the voltage is detected by an IC voltage comparator. The first stage of filtering and detection is performed by the output current sensor 180 employing circuit elements IC951:4, C954, C955, R970, R971, and R972. An additional asymmetrical filtering and delay function performed by the delay timer 170 is implemented with circuit elements, R968 R967, and C953. The signal is provided to another comparator section IC951:3 that provides output and hysteresis to feedback to the previous comparator. The output of the IC951:3 drives a transistor Q954 which discharges the charge integrator 135 in the dead time generator and that drives a transistor Q955 to force the gate drive output to a state of "low". The voltage variations over time at different points of the controller shown in FIG. 6 are depicted in FIG. 7. The output signal voltage variations produced by the current detector are generally much slower that those produced by the dead time generator. Thus a diagram showing the waveform will show many cycles of the ramp generator corresponding in time to one or two transitions from the current detector. By employing the circuit configuration described above, the synchronous rectifier controller is applied to properly control the gate of the MOSFET to achieve operation conditions as set forth specifically below:

1) The gate of the freewheel synchronous rectifier MOSFET must be turned "off" whenever the voltage on its drain is driven "high". If this is not assured and the gate of the freewheel synchronous rectifier MOSFET turns "on" when the voltage on its drain is driven "high", "cross conduction" current would flow. This wastes power, and any significant duration of this condition will probably destroy the power supply.

1a) In the main (+5) output with no magnetic amplifier, the voltage on the drain of the synchronous rectifier FET corresponds in time to the output of the primary switching transistor. Practical timing considerations require that the turn-off of the freewheel SR MOSFET gate be initiated before the turn on of the primary switching transistor. This anticipation is referred to as "dead time." This is because a small but significant time is required to transition the gate voltage from a fully "on" level to a fully "off" level. The cross conduction current which would result from this delay time postponing a reactively-triggered turn-off of the SR MOSFET gate would cause excessive power dissipation and possible voltage "spikes". The method of generating the anticipatory dead time is the unique aspect of this design.

1b) In the magnetic amplifier-regulated (+3.3) output, the timing considerations are easier. This is because the magnetic amplifier produces a minimum delay time after the main switching transistor is turned on and before the drain of the freewheel SR MOSFET is driven "high". As a result, an "anticipatory" signal is readily available and the design of the controller for the 3.3V SR MOSFET gate is significantly simpler as a result.

2) The gate of the freewheel synchronous rectifier MOSFET must be turned "off" when the inductor current approaches zero. If this is not the case and the MOSFET is held "on" as the inductor current approaches zero, the inductor current will continue to transition increasingly negative, with this negative current flowing through the MOSFET. At some point the MOSFET must be turned off, and this negative inductor current can cause a destructive voltage spike in response. In practice, this situation can arise when the output is not heavily loaded.

3) The gate of the freewheel synchronous rectifier MOSFET must be turned "on" as much as possible when the primary switching transistor is turned "off" and significant output current is flowing through the output inductor. This is the purpose of the synchronous rectifier, and it is useless if it is not turned on as needed.

According to above time sequences of controlling the gate voltage by using the synchronous rectifier controller, FIG. 7 shows the variations of voltages over time at different points of the synchronous rectifier jug controller relative to the transformer output.

FIG. 7 also shows an enabling and disabling timing diagram according to a circuit implemented as that shown in FIGS. 4 to 6. As described above, the timing ramp generator 120 (IC951) is applied to ramp up the voltage while the pulse generator comparator 125 compares the timing ramp voltage with the voltage on capacitor C951 of the charge integrator 135. Soon as the timing ramp voltage becomes higher than the voltage on capacitor C951 of the charge integrator 135, the transistor Q952 of the positive current source 130 becomes high. At that point in time, the voltage of the gate for the synchronous rectifier is driven to a low state. Therefore, precise control of the duration of the leading dead time is achieved to assure synchronous rectification is properly executed in synchronization with the switching actions on the primary side and sufficient safety margins are also provided.

According to above drawings and description, this invention discloses a new AC-to-DC converter that includes a transformer having a primary side for inputting an input signal and a secondary side for outputting an output signal. The converter further includes a synchronous rectifier controller connected only to circuits on the secondary side for controlling a synchronous rectifier (SR) switch on the secondary side for generating the output signal. The SR switch includes a MOSFET transistor having a gate connected to the synchronous rectifier controller. The synchronous rectifier controller further includes a plurality of circuit elements for turning off the SR switch before a main switch of the transformer is turned on and for turning on the SR switch when the main switch of the transformer is turned off. The synchronous rectifier controller includes a dead-time means for generating a dead-time for turning off the SR switch with a controlled dead-time before the main switch of the transformer is turned on. The synchronous rectifier controller includes a pulse differentiator for generating a narrow pulse corresponding to a timing of a main switch of the transformer is turned on. The dead-time means further includes a time-ramping means initiated by the narrow pulse from the pulse differentiator for generating an up-ramping voltage. The dead-time means further includes a dead-time comparator for comparing the up-ramping voltage with a voltage generated by a charge integrator for generating a dead-time signal for turning off an output current driver. The charge integrator includes a circuit having a fixed time-constant of charge-integration independent of an output load of the AC-to-DC converter. The synchronous rectifier controller further includes a positive current detector for enabling a positive current source for providing a constant positive current to charge the charge integrator. The synchronous rectifier controller further includes a positive current switch for turning on and off the positive current source depending on an output of a secondary winding of the transformer.

In essence, this invention discloses a new synchronous rectifier controller for an AC-to-DC converter. The synchronous rectifier controller is connected only to circuits on a secondary winding of a transformer of the AC-to-DC converter. The synchronous rectifier is responding to a voltage of secondary winding for controlling a synchronous rectifier (SR) switch on the secondary side for generating a DC output signal. In a preferred embodiment, the SR switch comprising a MOSFET transistor having a gate connected to the synchronous rectifier controller. In another preferred embodiment, the SR switch comprising a N-channel MOSFET transistor having a gate connected to the synchronous rectifier controller for turning off the MOSFET when a drain of the N-channel MOSFET transistor is driven high.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An AC-to-DC converter comprising:

a transformer having a primary side for inputting an input signal and a secondary side for outputting an output signal;

a synchronous rectifier controller connected only to circuits on said secondary side for controlling a synchronous rectifier (SR) switch on said secondary side for generating said output signal;

said SR switch comprising a MOSFET transistor having a gate connected to said synchronous rectifier controller;

said synchronous rectifier controller further comprising a plurality of circuit elements for turning off said SR switch before a main switch of said transformer is turned on and for turning on said SR switch when said main switch of said transformer is turned off;

said synchronous rectifier controller comprising a means for generating a dead-time for turning off said SR switch with a controlled dead-time before said main switch of said transformer is turned on;

said synchronous rectifier controller comprising a pulse differentiator for resetting and restarting a ramp generator at a time when a main switch driving said transformer on;

said dead-time means further comprising a voltage-ramping means initiated by an output from said pulse differentiator for generating an up-ramping voltage;

said dead-time means further comprising a dead-time comparator for comparing said up-ramping voltage with a voltage generated by a charge integrator for generating a dead-time signal for turning off an output current driver;

said charge integrator comprising a circuit having a fixed time-constant of charge-integration independent of an output load of said AC-to-DC converter;

said synchronous rectifier controller further comprising an output current detector for enabling a positive current source for providing a fixed positive current to charge said charge integrator; and said synchronous rectifier controller further comprising a switch for turning on and off said positive current source depending on an output of a secondary winding of said transformer.

2. An AC-to-DC converter comprising:

a transformer having a primary side for inputting an input signal and a secondary side for outputting an output DC signal;

a synchronous rectifier controller connected only to circuits on said secondary side for controlling a synchronous rectifier (SR) switch on said secondary side for generating said DC output signal; and said synchronous rectifier controller further comprising a plurality of circuit elements for turning off said SR switch before a main switch driving said transformer on and for turning on said SR switch when said main switch of said transformer is turned off wherein said synchronous rectifier controller further comprising a means for generating a dead-time for turning off said SR switch with a controlled dead-time before said main switch of said transformer is turned on.

3. The AC-to-DC converter of claim 2 wherein:

said SR switch comprising a MOSFET transistor having a gate connected to said synchronous rectifier controller.

4. AC-to-DC converter of claim 3 wherein:

said SR switch comprising a N-channel MOSFET transistor having a gate connected to said synchronous rectifier controller for turning off said MOSFET when a drain of said N-channel MOSFET transistor is driven high.

5. The AC-to-DC converter of claim 2 wherein:

said synchronous rectifier controller further comprising a pulse width modulation means for generating a pulse width duty cycle based on a feedback signal of said AC-to-DC converter.

6. The AC-to-DC converter of claim 5 wherein:

said pulse width modulation means connected to and controlling said SR switch.

7. The AC-to-DC converter of claim 2 wherein:

said synchronous rectifier controller comprising a pulse differentiator for resetting and restarting the voltage ramp generator at a time when a main switch driving said transformer on.

8. The AC-to-DC converter of claim 2 wherein:

said dead-time means further comprising a voltage-ramping means initiated by an output from said pulse differentiator for generating an up-ramping voltage; and said dead-time means further comprising a dead-time comparator for comparing said up-ramping voltage with a voltage generated by a charge integrator for generating a dead-time signal for turning off an output current driver.

9. The AC-to-DC converter of claim 8 wherein:

said charge integrator comprising a circuit having a fixed time-constant of charge-integration independent of an output load of said AC-to-DC converter.

10. The AC-to-DC converter of claim 8 wherein:

said synchronous rectifier controller further comprising a positive current detector for enabling a positive current source for providing a constant positive current to charge said charge integrator; and said synchronous rectifier controller further comprising a positive current switch for turning on and off said positive current source depending on an output of a secondary winding of said transformer.

11. The AC-to-DC converter of claim 2 wherein:

said synchronous rectifier controller comprising a voltage clamp waveform clipper connected to an output of a secondary winding of said transformer for providing a square waveform corresponding to said output of said secondary winding.

12. The AC-to-DC converter of claim 2 wherein:

said synchronous rectifier controller further comprising a current threshold detector connected to an output of a secondary winding of said transformer for sensing and turning off said SR switch when a current said output of said secondary winding is reduced below a threshold current.

* * * * *